US011573629B2

(12) United States Patent
Wang et al.

(10) Patent No.: US 11,573,629 B2
(45) Date of Patent: Feb. 7, 2023

(54) IMAGE PROCESSING AND DISPLAY METHOD, AUGMENTED REALITY DEVICE, IMAGE PROCESSING DEVICE, AND DISPLAY SYSTEM

(71) Applicants: Beijing BOE Optoelectronics Technology Co., Ltd., Beijing (CN); BOE Technology Group Co., Ltd., Beijing (CN)

(72) Inventors: Xuefeng Wang, Beijing (CN); Yanqiu Zhao, Beijing (CN); Qingwen Fan, Beijing (CN); Jinghua Miao, Beijing (CN); Lili Chen, Beijing (CN); Hao Zhang, Beijing (CN); Xi Li, Beijing (CN); Longhui Wang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/519,312

(22) Filed: Nov. 4, 2021

(65) Prior Publication Data
US 2022/0187903 A1    Jun. 16, 2022

(30) Foreign Application Priority Data
Dec. 14, 2020    (CN) .......................... 202011475969.6

(51) Int. Cl.
*G06T 7/70*    (2017.01)
*G06F 3/01*    (2006.01)
(Continued)

(52) U.S. Cl.
CPC ............ *G06F 3/011* (2013.01); *G02B 27/017* (2013.01); *G06T 7/70* (2017.01); *G06T 7/90* (2017.01);
(Continued)

(58) Field of Classification Search
CPC .. G06F 3/011; G06T 7/90; G06T 7/70; G06V 40/103; G06V 20/00; G02B 27/017; G02B 2027/014
See application file for complete search history.

(56) References Cited

U.S. PATENT DOCUMENTS

2013/0194304 A1* 8/2013 Latta ...................... G09G 3/003
345/633
2016/0210736 A1* 7/2016 Aruga ................ G02B 27/0172
(Continued)

*Primary Examiner* — Terrell M Robinson
(74) *Attorney, Agent, or Firm* — IPro, PLLC

(57) ABSTRACT

An image processing and displaying method, AR device, image processing device, and a display system are provided. The image processing and displaying method is applied to a display system, wherein the display system includes an Augmented Reality (AR) device and an image processing device, and the image processing and displaying method includes: acquiring, by the AR device, a real-time image of a current view field of a user wearing the AR device in a real environment; sending, by the AR device, the real-time image to the image processing device; receiving, by the AR device, a display direction, an imaging distance, and a target image sent by the image processing device, and displaying, by the AR device, the target image in a virtual display area according to the display direction and the imaging distance.

20 Claims, 5 Drawing Sheets

(51) Int. Cl.
*G06T 7/90* (2017.01)
*G06V 40/10* (2022.01)
*G06V 20/00* (2022.01)
*G02B 27/01* (2006.01)

(52) U.S. Cl.
CPC ............ *G06V 20/00* (2022.01); *G06V 40/103* (2022.01); *G02B 2027/014* (2013.01)

(56) References Cited

U.S. PATENT DOCUMENTS

| | | | |
|---|---|---|---|
| 2016/0371888 A1* | 12/2016 | Wright | G06F 3/011 |
| 2017/0124713 A1* | 5/2017 | Jurgenson | G06T 19/20 |
| 2017/0139474 A1* | 5/2017 | Rochford | G06F 3/017 |
| 2020/0241731 A1* | 7/2020 | Xin | G06T 1/20 |

\* cited by examiner

IMAGE PROCESSING AND DISPLAY METHOD, AUGMENTED REALITY DEVICE, IMAGE PROCESSING DEVICE, AND DISPLAY SYSTEM

CROSS-REFERENCE TO RELATED APPLICATIONS

This application claims priority to Chinese Patent Application No. 202011475969.6 filed in China on Dec. 14, 2020, the entire contents of which are hereby incorporated by reference.

TECHNICAL FIELD

The present disclosure relates to the field of display technology, and particularly, the present disclosure relates to an image processing and displaying method, an Augmented Reality (AR) device, image processing device, and a display system.

BACKGROUND

AR is a technology to calculate the position and angle of camera image in real time, and add corresponding images, videos and three-Dimensional (3D) models. An AR head-display device is a wearable device which realizes an AR technology and can be worn on a human head for display. Virtual information can be overlapped into a real world through a computer technology, so that a real environment and virtual objects can be overlapped on a same image in real time, so as to realize the mutual supplement of the two kinds of information, and display an image before the user's eyes through a helmet, glasses, and other devices, so as to enhance the sense of reality of a user.

However, the AR glasses of the related art usually have a problem that the display of the target image is not clear.

SUMMARY

Embodiments of the present disclosure provide an image processing and displaying method, AR device, image processing device, and a display system.

In a first aspect, the present disclosure provides an image processing and displaying method applied to a display system, wherein the display system includes an Augmented Reality (AR) device and an image processing device, and the image processing and displaying method includes:

acquiring, by the AR device, a real-time image of a current view field of a user wearing the AR device in a real environment;

sending, by the AR device, the real-time image to the image processing device;

receiving, by the AR device, a display direction, an imaging distance, and a target image sent by the image processing device, and displaying, by the AR device, the target image in a virtual display area according to the display direction and the imaging distance.

In a possible implementation, the image processing and displaying method further includes: before acquiring, by the AR device, the real-time image of the current view field of the user wearing the AR device in the real environment, receiving a display mode selection instruction;

determining a display mode according to the display mode selection instruction, wherein the display mode includes a projection mode and a spatial mode; in the display mode, the display direction correspondingly changes as the current view field changes; in the spatial mode, the display direction is a preset fixed direction; and sending the display mode to the image processing device.

In a possible implementation, the image processing and displaying method further includes: before acquiring, by the AR device, the real-time image of the current view field of the user wearing the AR device in the real environment, scanning an environmental scene within a preset range in the real environment to form an environmental scene image;

sending the environmental scene image to the image processing device.

In a possible implementation, the image processing and displaying method further includes:

detecting a light change of the environmental scene in the real environment;

adjusting a transmittance of a lens of the AR device according to the light change.

In a possible implementation, the image processing and displaying method further includes: after sending, by the AR device, the real-time image to the image processing device, receiving, by the image processing device, the real-time image sent by the AR device;

adjusting, by the image processing device, an image to be displayed based on the real-time image, and taking, by the image processing device, the adjusted image to be displayed as the target image;

determining, by the image processing device, the display direction and the imaging distance according to the real-time image and a pre-stored environmental scene image; and sending the target image, the display direction, and the imaging distance to the AR device, wherein the environmental scene image includes an area corresponding to a virtual display area configured for displaying the target image.

In a possible implementation, the adjusting, by the image processing device, the image to be displayed based on the real-time image, includes:

performing color analysis on the real-time image to obtain a color of the real-time image;

determining whether a display difference between a color of a text in the image to be displayed and the color of the real-time image is less than a preset value;

when the display difference between the color of the text in the image to be displayed and the color of the real-time image is less than the preset value, adjusting the color of the text in the image to be displayed, to enable the display difference between the color of the text in the image to be displayed and the color of the real-time image to be not less than the preset value.

In a possible implementation, the adjusting, by the image processing device, the image to be displayed based on the real-time image, includes:

detecting whether there is an image of a person in the real-time image;

when there is the image of the person in the real-time image, adjusting a display style of the text in the image to be displayed, to enable the text in the image to be displayed to be separated from the image of the person, wherein the display style includes at least one of: a display area, a display size, and a display quantity.

In a possible implementation, the adjusting, by the image processing device, the image to be displayed based on the real-time image, includes:

detecting whether there is a fixed blocking object image in the real-time image; the fixed blocking object image corresponds to a fixed blocking object in an environmental scene in the real environment;

when there is the fixed blocking object image in the real-time image, adjusting the display style of the text in the image to be displayed, to enable the text in the image to be displayed to be separated from the fixed blocking object image; the display style includes at least one of: the display area, the display size, and the display quantity; and/or, determining the display direction and the imaging distance according to the real-time image and the pre-stored environmental scene image, includes:

detecting whether there is a fixed blocking object image in the real-time image; the fixed blocking object image corresponds to a fixed blocking object in an environmental scene in the real environment;

when there is the fixed blocking object image in the real-time image, adjusting the imaging distance to be modified of the text in the image to be displayed, and taking the adjusted imaging distance to be modified as the imaging distance, to enable the text in the image to be displayed to be separated from the fixed blocking object image.

In a possible implementation, the image processing and displaying method further includes: before receiving, by the image processing device, the real-time image sent by the AR device, receiving the display mode sent by the AR device;

the determining the display direction and the imaging distance according to the real-time image and the pre-stored environmental scene image includes:

when determining that the display mode is the projection mode, determining a direction range of the current visual field of the user wearing the AR device according to the real-time image and the pre-stored environmental scene image, and taking a preset direction in the direction range of the current visual field as the display direction; and when determining that the display mode is the spatial mode, taking the preset fixed direction corresponding to the pre-stored environmental scene image as the display direction.

In a possible implementation, the AR device is AR glasses or an AR helmet.

In a second aspect, embodiments of the present disclosure provide the AR device, which includes:

an acquisition circuit, configured for acquiring a real-time image of a current view field of a user wearing the AR device in a real environment;

a first sending circuit, configured for sending the real-time image to the image processing device, to enable the image processing device to adjust the image to be displayed based on the real-time image, take the adjusted image to be displayed as the target image, determine a display direction and an imaging distance according to the real-time image and the environmental scene image pre-stored in the image processing device, and send the target image, the display direction and the imaging distance to the AR device, wherein the environmental scene image includes an area corresponding to a virtual display area configured for displaying the target image; and a display circuit, configured for receiving the target image, the display direction, and the imaging distance sent by the image processing device, and displaying the target image in the virtual display area according to the display direction and the imaging distance.

In a possible implementation, the acquisition circuit is a camera circuit.

In a possible implementation, the AR device further includes:

a light sensing device, communicatively connected to the display circuit and configured for detecting a light change of the environmental scene in the real environment and sending the light change to the display circuit, wherein the display circuit is further configured for adjusting a lens transmittance of the AR device based on the light change.

In a third aspect, embodiments of the present disclosure provide an image processing device which includes:

a receiving circuit, configured for receiving a real-time image of a current view field of a user wearing an AR device in a real environment sent by the AR device;

a first processing circuit, configured for adjusting an image to be displayed based on the real-time image, and taking the adjusted image to be displayed as a target image;

a second processing circuit, configured for determining a display direction and an imaging distance according to the real-time image and an environmental scene image pre-stored in the image processing device; and a second sending circuit, configured for sending the target image, the display direction, and the imaging distance to the AR device.

In a fourth aspect, embodiments of the present disclosure provide a display system which includes:

a processor, a memory electrically connected to a processor;

at least one program stored in a memory and configured to be executed by the processor, wherein the at least one program is configured for implementing the image processing and displaying method as described in the first aspect.

In a fifth aspect, embodiment of the present disclosure provides a display system including the AR device according to the second aspect and an image processing device;

the image processing device is configured for adjusting an image to be displayed based on the real-time image, taking the adjusted image to be displayed as a target image, determining a display direction and an imaging distance according to the real-time image and an environmental scene image pre-stored in the image processing device, and sending the target image, the display direction, and the imaging distance to the AR device, wherein the environmental scene image includes an area corresponding to a virtual display area for displaying the target image.

In a sixth aspect, embodiments of the present disclosure provide a computer-readable storage medium which is configured for storing computer instructions that, when executed on a computer, implement the image processing and displaying method of the first aspect.

Additional aspects and advantages of the disclosure will be partially presented in the following descriptions and partially become apparent from the following descriptions or get understood by implementing the disclosure.

BRIEF DESCRIPTION OF THE DRAWINGS

The foregoing and/or additional aspects and advantages of the present disclosure will become apparent and readily appreciated from the following description of embodiments in conjunction with the accompanying drawings, in which.

DETAILED DESCRIPTION

Figure 1:
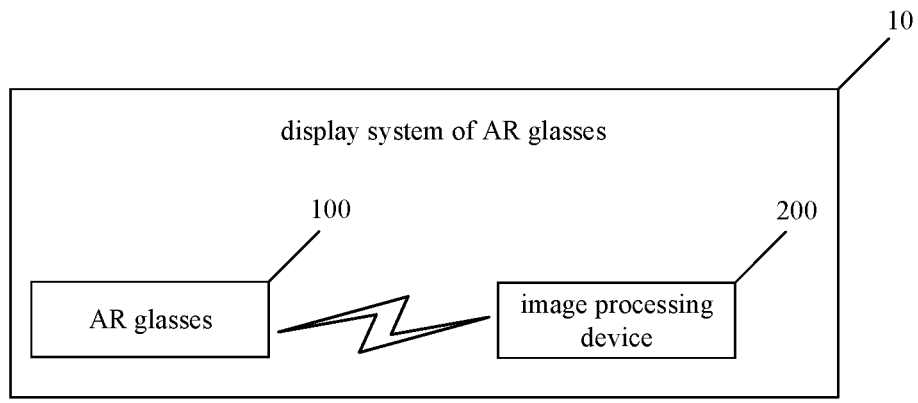
FIG. 1 is a schematic structural diagram of a display system of AR glasses provided by an embodiment of the present disclosure.

Description will now be made in detail to the present disclosure, examples of the embodiments of the present disclosure are illustrated in the accompanying drawings, wherein the same or similar reference numerals refer to the same or similar parts or parts having the same or similar functions throughout. Furthermore, if a detailed description of known technology is not necessary for illustrating the features of the present disclosure, it is omitted. The embodiments described below with reference to the drawings are exemplary and intended to explain the disclosure and should not be explained as limits to the disclosure.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the related art and will not be interpreted in an idealized or overly formal sense unless expressly so defined herein.

As used herein, the singular forms "a", "an", "the" and "this" may include the plural forms as well, unless expressly stated otherwise. It should be further understood that the terms "includes" and/or "including" when used in this specification, specify the presence of the features, integers, steps, operations, elements, and/or components, but do not preclude the presence or addition of one or more other features, integers, steps, operations, elements, components, and/or groups thereof. It should be understood that when an element is referred to as being "connected" or "coupled" to another element, it can be directly connected or coupled to the other element, or intervening elements may also be present. Furthermore, "connected" or "coupled" as used herein can include wirelessly connected or wirelessly coupled. As used herein, the term "and/or" includes all or any one of one or more associated listed items and all combinations thereof.

Hereinafter, the technical solutions of the present disclosure and how the technical solutions of the present disclosure solve the above technical problems will be described in detail with specific embodiments.

The embodiments of the present disclosure provide a display system 10 of AR glasses 100, referring to FIG. 1, which includes: AR glasses 100 and an image processing device 200 which are communicatively connected; the AR glasses 100 are configured for acquiring a real-time image of a current visual field range of a user wearing the AR glasses 100 in a real environment, sending the real-time image to image processing device 200, receiving a target image, a display direction, and an imaging distance sent by the image processing device 200, and displaying the target image in a virtual display area 300 according to the display direction and the imaging distance; the image processing device 200 is configured for adjusting an image to be displayed based on the real-time image, taking the adjusted image to be displayed as the target image, determining the display direction and the imaging distance according to the real-time image and an environmental scene image pre-stored in the image processing device 200, and sending the target image, the display direction, and the imaging distance to the AR glasses 100, wherein the environmental scene image includes an area 300 corresponding to the virtual display area for displaying the target image.

Optionally, the environmental scene image is a pre-scanned image of the environmental scene in which the AR glasses 100 are located, so as to determine the display direction and the imaging distance, determine the virtual display area 300, and the AR glasses 100 can display the target image to the virtual display area 300 according to the display direction and the imaging distance.

Optionally, the target image includes texts.

Optionally, referring to FIG. 1, the AR glasses 100 and the image processing device 200 are in a wireless communication connection.

The AR glasses 100 of the embodiment of the present disclosure can send the real-time image of the current visual field range of the user wearing the AR glasses 100 in the real environment to the image processing device; the image processing device adjusts the image to be displayed based on the real-time image, and takes the adjusted image to be displayed as the target image, so that the target image will be adjusted in real-time according to the change of the real-time image of the visual field range of the user wearing the AR glasses in the real environment, so as to adapt to the environmental scene of the real world where the AR glasses 100 are located in real time, and be organically fused with the real-time image of the environmental scene of the real world; and thus, the user can always obtain an immersive experience and it improves the user experience.

Optionally, the AR glasses 100 can be used as a tele-prompter to facilitate the display of prompt information (e.g., the text) to the user wearing the AR glasses 100. The text can be included in the target image displayed on the virtual display area 300. The target image can be seen in the case where the view field of the user wearing the AR glasses 100 includes the virtual display area 300.

Optionally, the image processing device 200 can be a cell phone, a mobile box or server or the like capable of implementing the image processing method of the embodiments of the present disclosure.

Optionally, the virtual display area 300 can be variable or constant, and the virtual display area 300 is not visible to other people except the user wearing the AR glasses 100, and thus does not exist to other people.

Figure 2:
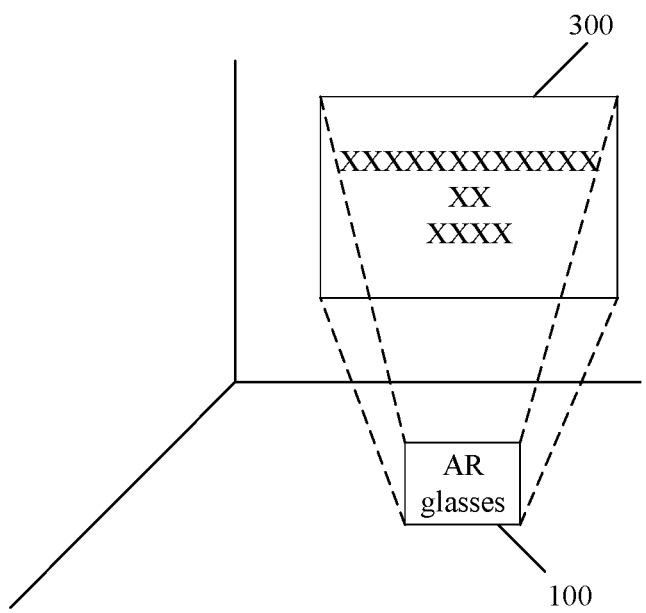
FIG. 2 is a principle schematic diagram of the AR glasses for displaying in a virtual display area provided by an embodiment of the present disclosure.

Optionally, referring to FIG. 2, a principle schematic diagram of the AR glasses 100 displaying the target image to the virtual display area 300 is shown, wherein X represents the texts displayed in the target image, and a dotted line represents a display boundary for displaying according to the display direction and the imaging distance, and the virtual display area 300 is located in front of the AR glasses 100 at this time, and within the view field of a user wearing the AR glasses 100, and the user can see the texts on the virtual display area 300.

Figure 3:
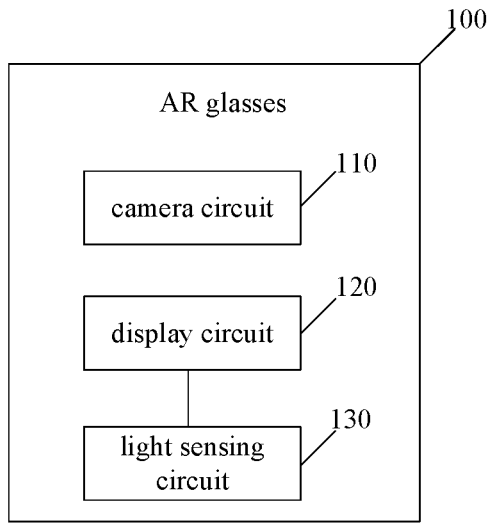
FIG. 3 is a schematic structural diagram of the AR glasses provided by an embodiment of the present disclosure.

Based on the same invention concept, the embodiment of the present disclosure provides the AR glasses 100, referring to FIG. 3, the AR glasses 100 include a camera circuit 110 and a display circuit 120.

The camera circuit 110, for example, is a camera, and is configured for acquiring the real-time image of the current visual field range of the user wearing the AR glasses 100 in the real environment, and sending the real-time image to the image processing device 200, so that the image processing device 200 adjusts the image to be displayed based on the real-time image, takes the adjusted image to be displayed as the target image, and determines the display direction and the imaging distance according to the real-time image and the environmental scene image pre-stored in the image processing device 200, wherein the environmental scene image includes the area 300 corresponding to the virtual display area for displaying the target image. Specifically, the camera circuit 110 can take a picture of the real-time environment in which the current user is located.

The display circuit 120 is configured for receiving the target image, the display direction, and the imaging distance sent by the image processing device 200, and displaying the target image to the virtual display area 300 according to the display direction and the imaging distance.

Optionally, the camera circuit 110 and the display circuit 120 may be or may not be communicatively connected to each other. Both the camera circuit 110 and the display circuit 120 are communicatively connected to the image processing device 200.

Optionally, the camera circuit 110 is configured for scanning the environmental scene within the preset range in the real environment to form the environmental scene image and sending the environmental scene image to the image processing device. The environmental scene within the preset range needs to include the virtual display area 300 for displaying the target image.

Optionally, scanning the environmental scene within the preset range in the real environment can be scanning the entire environmental scene in the real world, and the environmental scene can be a three-dimensional space image.

In some embodiments, referring to FIG. 3, the AR glasses 100 further include: a light sensing device 130, wherein the light sensing device 130 is communicatively connected to the display circuit 120.

The light sensing device 130 is configured for detecting light changes of the environmental scene in the real environment and for sending the light changes to the display circuit 120.

The display circuit 120 is also configured for adjusting the lens transmittance of the AR glasses 100 based on the light changes.

Optionally, the display circuit 120 decreases the lens transmittance of the AR glasses 100 when the light becomes strong, and increases the lens transmittance of the AR glasses 100 when the light becomes weak. The AR glasses 100 of the embodiments of the present disclosure allow the user wearing the AR glasses 100 to see the target image more clearly by adjusting the lens transmittance.

Optionally, the AR glasses 100 further include a selection button for selecting a display mode, and options of the selection button include a projection mode and a spatial mode. The user can select to use the projection mode or the spatial mode according to the situation of the environment scene. Specifically, the display direction of the projection mode correspondingly changes as the current view field changes and the display direction of the spatial mode is a preset fixed direction.

For example, when the AR glasses 100 use the projection mode, the target image including the prompt text always appears in the view field of the AR glasses 100, is displayed in front of the user's eyes, and moves following the changes of the user's head posture.

For another example, when the AR glasses 100 use the spatial mode, the AR glasses 100 scan the environmental scene in the preset range in advance, and then fix the reminding content as the virtual object at the certain specific position in space, wherein the certain specific position is the position of the virtual display area 300 correspondingly determined according to the designed display direction and the imaging distance; and when the head posture changes, a person's sight line can leave the reminding content of the target image.

The AR glasses 100 of the embodiments of the present disclosure can select different display modes according to different use scenarios, and the two modes can be easily switched, thereby giving the user a better experience in different application scenarios.

Compared with the teleprompter in the related art, the teleprompter using the AR glasses 100 of the embodiments of the present disclosure presents the target image display including the words directly in front of the user, the user can move freely, and the target image can always be in front of the user's eyes to remind the user of words; or the target image is fixed at the specific direction, and when the user needs to watch the words, the words can be seen by user turning the head to the specific direction, which is convenient to use.

Meanwhile, in the embodiments of the present disclosure, the teleprompter using the AR glasses 100 uses a split-type design to separate the AR glasses 100 from the image processing device 200, i.e., the hardware for processing and the hardware for displaying are separated from each other, that is, the image processing and the formation of the target image are both implemented by the image processing device 200 and sent back to the AR glasses 100 for displaying, so as to reduce the weight of the glasses to be easily worn by the user.

Embodiments of the present disclosure can select the different display modes according to the different environmental scenarios.

For example, for being used in a lecture in an exhibition hall, the texts preferably always move along with the speaker (i.e. the user), and the projection mode of the AR glasses 100 can be used to ensure that the picture is always in front of the human eyes. Since the current view field of the AR glasses 100 is constantly changing, the target image of the AR glasses 100 can also constantly adjust the position of the virtual display area according to the user's view field.

For example, in a lecture in an auditorium, the spatial mode of the AR glasses 100 can be used because the surrounding environmental scene is fixed. Taking the reminding content of the AR glasses 100 as a part of the space, like a blackboard or a poster, the virtual display area is fixed at a specific position in the space, and the display style of the target image of the AR glasses 100 changes when the environment around the virtual display area changes.

Figure 4:
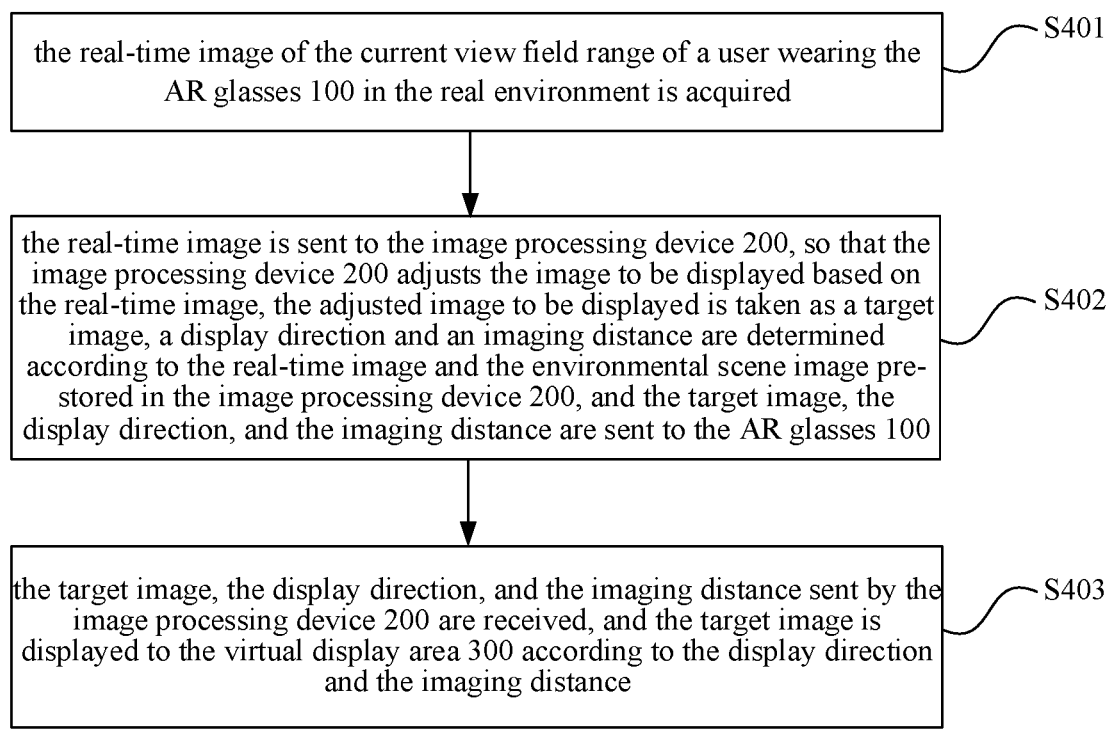
FIG. 4 is a schematic flow diagram of a display method of the AR glasses provided by an embodiment of the present disclosure.

Based on the same inventive concept, the embodiment of the present disclosure provides a display method of the AR glasses 100, which is performed by the AR glasses 100, referring to FIG. 4, the display method of the AR glasses 100 includes steps S401 to S403.

In step S401, the real-time image of the current view field range of a user wearing the AR glasses 100 in the real environment is acquired.

Optionally, the AR glasses 100 acquire the real-time image of the current view field of the user wearing the AR glasses 100 in the real environment.

In some embodiments, before acquiring the real-time image of the current view field of the user wearing the AR glasses 100 in the real-world environment, the display method further includes: when a display mode selection instruction is received, the display mode is determined according to the display mode selection instruction; the display modes include at least one of the projection mode and the space mode, and the display direction of the projection mode correspondingly changes with the current visual field range; and the display direction of the spatial mode is the preset fixed direction.

The display mode is sent to the image processing device 200.

Optionally, the AR glasses 100 include the selection button for selecting the display mode, and the display mode selection instruction is sent by the user manually selecting the selection button of the display mode.

In some embodiments, before acquiring the real-time image of the current view field range of the user wearing the AR glasses 100 in the real-world environment, the display method further includes: the environmental scene within the preset range in the real environment is scanned to form the environmental scene image; the environmental scene image is sent to the image processing device 200.

In step S402, the real-time image is sent to the image processing device 200, so that the image processing device 200 adjusts the image to be displayed based on the real-time image, the adjusted image to be displayed is taken as a target image, a display direction and an imaging distance are determined according to the real-time image and the environmental scene image pre-stored in the image processing device 200, and the target image, the display direction, and the imaging distance are sent to the AR glasses 100, wherein the environmental scene image includes the area 300 corresponding to the virtual display area for displaying the target image.

Optionally, the AR glasses 100 transmit the real-time image to the image processing device 200, so that the image processing device 200 adjusts the image to be displayed based on the real-time image, takes the adjusted image to be displayed as the target image, determines the display direction and the imaging distance according to the real-time image and the environmental scene image pre-stored in the image processing device 200, and transmits the target image, the display direction, and the imaging distance to the AR glasses 100, wherein the environmental scene image includes the area 300 corresponding to the virtual display area for displaying the target image.

In step S403, the target image, the display direction, and the imaging distance sent by the image processing device 200 are received, and the target image is displayed to the virtual display area 300 according to the display direction and the imaging distance.

Optionally, the AR glasses 100 receive the object image, the display direction, and the imaging distance sent from the image processing device 200, and displays the object image to the virtual display area 300 according to the display direction and the imaging distance.

In some embodiments, the displaying method of the AR glasses 100 further includes: the light changes of the environmental scene in the real environment are detected; the transmittance of the lens of the AR glasses 100 is adjusted according to the light changes.

Optionally, the AR glasses 100 includes the light sensing device 130, which is configured for detecting light changes of the environmental scene in the real-world environment; the transmittance of the lens of the AR glasses 100 is adjusted according to the light changes.

Figure 5:
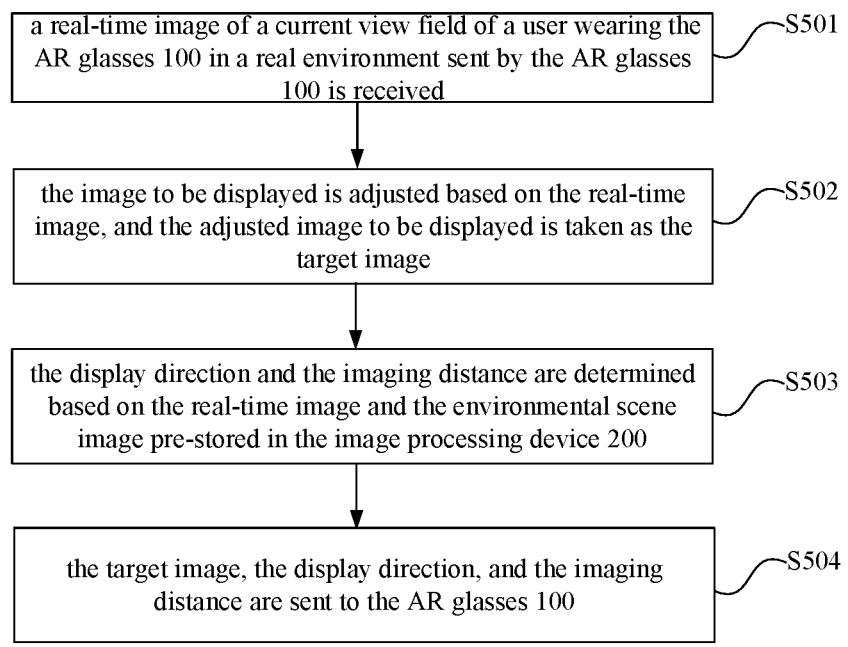
FIG. 5 is a schematic structural diagram of an image processing method provided by an embodiment of the present disclosure.

Based on the same invention concept, the embodiment of the present disclosure provides the image processing method to be executed by the image processing device 200, which includes steps S501 to S504, referring to FIG. 5.

In step S501, a real-time image of a current view field of a user wearing the AR glasses 100 in a real environment sent by the AR glasses 100 is received.

Optionally, the image processing device 200 receives the real-time image of the current view field range of the user wearing the AR glasses 100 in the real environment sent by the AR glasses 100.

In step S502, the image to be displayed is adjusted based on the real-time image, and the adjusted image to be displayed is taken as the target image.

Optionally, the image processing device 200 adjusts the image to be displayed based on the real-time image, the adjusted image to be displayed is taken as the target image.

In some embodiments, the image to be displayed is adjusted based on the real-time image, further includes: color analysis is performed on the real-time image to obtain the color of the real-time image; whether the difference between the color of the text in the image to be displayed and the color of the real-time image is less than a preset value is determined; if the difference between the color of the text in the image to be displayed and the color of the real-time image is less than the preset value, adjusting the color of the text in the image to be displayed so that the difference between the color of the text in the image to be displayed and the color of the real-time image is not less than the preset value; if the difference between the color of the texts in the image to be displayed and the color of the real-time image is not less than a preset value, the color of the texts in the image to be displayed is kept unchanged.

Optionally, the display difference between the color of the texts in the image to be displayed and the color of the real-time image is greater than the preset value, so as to ensure that the color of the texts in the target image is different from or not similar to the color of the area corresponding to the real-time image of the current visual field range of the AR glasses 100, so as to facilitate the user to see the content displayed in the target image.

In some embodiments, the image to be displayed is adjusted based on the real-time image, further includes: whether there is the image of the person in the real-time image is detected;

if there is the image of the person, the display style of the texts in the image to be displayed is adjusted so as to separate the texts in the image to be displayed from the image of the person; and the display style includes at least one of the following: the display area, the display size, and the display quantity.

In some embodiments, the image to be displayed is adjusted based on the real-time image, further includes: whether the real-time image has the fixed blocking object image is detected; the fixed blocking object image corresponds to a fixed blocking object under the environmental scene in the real environment; when there is the fixed blocking object image in the real-time image, the display style of the texts in the image to be displayed is adjusted so that the texts in the image to be displayed are separated from the fixed blocking object image; the display style includes at least one of: the display area, the display size, and the display quantity; and/or, the display direction and the imaging distance are determined according to the real-time image and the environmental scene image pre-stored in the image processing device 200, which includes: whether the real-time image has the fixed blocking object image is detected, wherein the fixed blocking object image corresponds to the fixed blocking object under the environmental scene in the real environment; when there is the fixed blocking object image in the real-time image, the imaging distance to be adjusted of the text in the image to be displayed is adjusted, and the adjusted imaging distance is taken as the imaging distance, so that the texts in the image to be displayed are separated from the fixed blocking object image.

In step S503, the display direction and the imaging distance are determined based on the real-time image and the environmental scene image pre-stored in the image processing device 200.

Optionally, the image processing device 200 determines the display direction and the imaging distance according to the real-time image and the environmental scene image pre-stored in the image processing device 200.

In some embodiments, in step S401, before the real-time image of the current view field range of the user wearing the AR glasses 100 in the real environment sent by the AR glasses 100 is received, the method further includes: the display mode sent by the AR glasses 100 is received; the display direction and the imaging distance are determined according to the real-time image and the environmental scene image pre-stored in the image processing device 200, which includes: if it is determined that the display mode is the projection mode, the direction range of the current visual field of the AR glasses 100 is determined according to the real-time image and the pre-stored environmental scene image, and the preset direction in the direction range of the current visual field is taken as the display direction.

If it is determined that the display mode is the spatial mode, the preset fixed direction corresponding to the pre-stored environmental scene image is taken as the display direction.

Optionally, in step S401, before the real-time image of the current view field range of the user wearing the AR glasses 100 in the real environment sent by the AR glasses 100 is received, the method further includes: the display mode corresponding to the environmental scene is identified according to the pre-stored environmental scene image so as to determine the display mode, wherein the display mode includes at least one of the following: the projection mode and the spatial mode. That is, the image processing device 200 can select the display mode according to the environmental scene, without requiring the user to set the display mode through the AR glasses 100.

The projection mode of the embodiment of the present disclosure can correspondingly adjust the display direction according to the change of the current view field of the AR glasses 100, so that the position of the target image can be adjusted according to the head postures of the user wearing the AR glasses, and the target image can also be seen by the user when the user wearing the AR glasses rotates their head.

In step S504, the target image, the display direction, and the imaging distance are sent to the AR glasses 100.

Optionally, the image processing device 200 transmits the object image, the display direction, and the imaging distance to the AR glasses 100.

Figure 6:
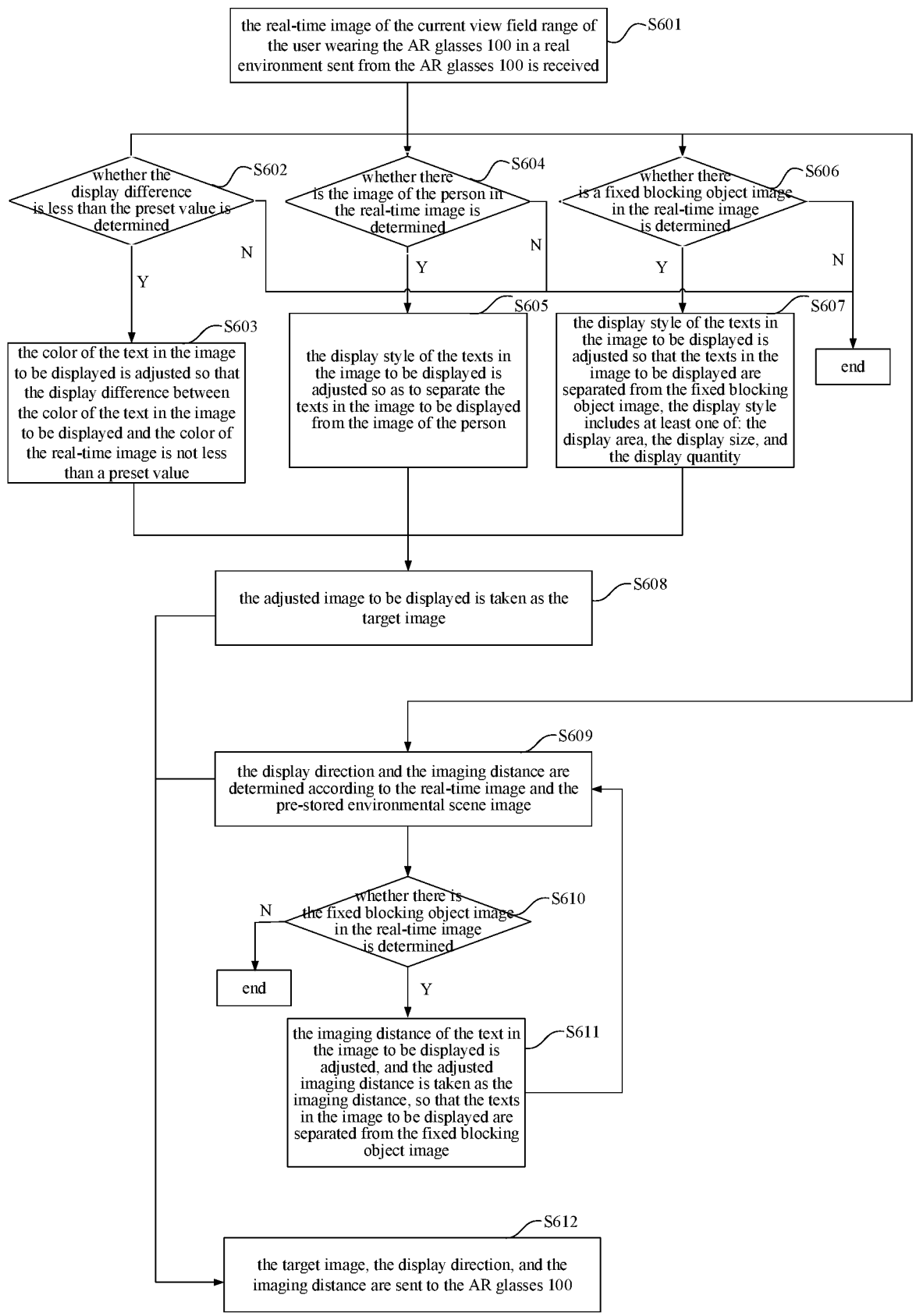
FIG. 6 is a schematic flow diagram of another image processing method provided by an embodiment of the present disclosure.

Based on the above-mentioned technical solution, the embodiment of the present disclosure provides the image processing method, which is applied to the image processing device 200, referring to FIG. 6, the image processing method includes the following steps.

In step S601, the real-time image of the current view field range of the user wearing the AR glasses 100 in a real environment sent from the AR glasses 100 is received, and then steps S602, S604, S606, and S609 are performed.

In step S602, whether the display difference between the color of the text in the image to be displayed and the color of the real-time image is less than the preset value is determined; if it is, step S603 is performed, and if it is not, the process ends.

Optionally, before the step S602, color analysis is performed on the real-time image to obtain the color of the real-time image.

Optionally, the display difference between the color of the texts in the image to be displayed and the color of the real-time image is greater than the preset value, so as to ensure that the color of the texts in the target image is different from or not similar to the color of the area corresponding to the real-time image of the current visual field range of the AR glasses 100, so as to facilitate the user to see the content displayed in the target image.

In step S603, the color of the text in the image to be displayed is adjusted so that the display difference between the color of the text in the image to be displayed and the color of the real-time image is not less than a preset value, and then step S608 is executed.

In step S604, it is determined whether or not there is the image of the person in the real-time image, and if it is, step S605 is executed, and if it is not, the process ends.

In step S605, the display style of the texts in the image to be displayed is adjusted so as to separate the texts in the image to be displayed from the image of the person; and the display style includes at least one of the following: the display area, the display size, and the display quantity, then step S608 is executed.

Optionally, the image of the person includes at least part of a body of the person, such as a head or a limb. The inventor of the present disclosure considers that when there is the image of the person in the real-time image, the image of the person at least partially coincides with the texts in the target image, the display effect of the texts in the target image are affected, and therefore it is necessary to adjust the display style of the texts in the image to be displayed, so that the texts in the image to be displayed are separated from the image of the person, thereby separating the texts in the target image of the virtual display area 300 from the person in the environmental scene in real time.

The inventors of the present disclosure considers that the person generally moves and occupies only a small area in the image, and the display quality can be improved by selecting a mode of adjusting the display style so that the texts in the image to be displayed are separated from the image of the person.

Optionally, if there is the image of the person in the real-time image, the imaging distance of the texts in the image to be displayed is adjusted, so that the position of the virtual display area 300 changes to achieve that the texts displayed by the AR glasses 100 in the target image of the virtual display area 300 are separated from the person in the environmental scene.

In step S606, whether the fixed blocking object image exists in the real-time image or not is determined, if so, step S607 is executed, and if not, the process ends.

In step S607, the display style of the texts in the image to be displayed is adjusted so that the texts in the image to be displayed are separated from the fixed blocking object image; the display style includes at least one of: the display area, the display size, and the display quantity.

Optionally, the imaging distance to be modified is the imaging distance at the previous moment, and the adjusted imaging distance to be modified is taken as the imaging distance and is the imaging distance corresponding to the adjusted image to be displayed.

Optionally, the fixed blocking object includes, e.g., a wall or a post, and the inventor of the present disclosure considers that when the fixed blocking object image exists in the real-time image, the fixed blocking object image at least partially overlaps with the texts in the target image, the display effect of the text in the target image is affected, and therefore it is necessary to adjust the display style of the texts in the image to be displayed, so that the texts in the image to be displayed are separated from the fixed blocking object, and the texts in the target image displayed by the AR glasses 100 in the virtual display area 300 are separated from the fixed blocking object in the environmental scene.

Optionally, the step of detecting whether there is the fixed blocking object image in the real-time image is primarily used in the projection mode, since the virtual display area 300 in the spatial mode is preset and will be considered to avoid the fixed blocking object. Therefore, when the display mode is the spatial mode, it is mainly detected whether there is the image of the person in the real-time image.

Optionally, the image processing device 200 pre-stores the environmental scene image, and can simulate displaying the image to be displayed in the area corresponding to the virtual display area 300 in the environmental scene image, and according to the image of the person or the fixed blocking object image in the real-time image, the display style and/or the imaging distance of texts in the image to be displayed are adjusted so that the texts displayed by the AR glasses 100 in the target image of the virtual display area 300 are separated from the person or the fixed blocking object in the environmental scene.

It is conceivable that the target image may also include prompt information such as graphics, and the principle of adjusting the graphics in the image to be displayed is the same as the principle of adjusting the text in the image to be displayed.

In step S608, the adjusted image to be displayed is taken as the target image.

In step S609, the display direction and the imaging distance are determined according to the real-time image and the pre-stored environmental scene image, and the process goes to step S610.

Optionally, in step S609, according to the real-time image and the pre-stored environmental scene image, the display direction and the imaging distance are determined, which includes: if it is determined that the display mode is the projection mode, the direction range of the current visual field of the user wearing the AR glasses 100 in the real time environment is determined according to the real-time image and the pre-stored environmental scene image, and the preset direction in the direction range of the current visual field is taken as the display direction; if it is determined that the display mode is the spatial mode, the preset fixed direction corresponding to the pre-stored environmental scene image is taken as the display direction.

Optionally, the preset direction in the range of directions of the current view field is directly in front of the current view field.

Optionally, the preset fixed direction corresponding to the pre-stored environmental scene image is taken as the display direction, which includes: the environmental scene image is displayed on the display interface of the image processing device 200; the confirmation selection box instruction is received, and the area corresponding to the virtual display area 300 in the environmental scene image is determined according to the area selected by the selection box determined by the confirmation selection box instruction;

According to the area in the environmental scene image corresponding to the virtual display area 300, the preset fixed direction corresponding to the environmental scene image is determined and stored as the display direction.

Optionally, the person autonomously selects an appropriate position as the virtual display area 300 in the environmental scene through the selection box corresponding to the virtual display area 300 on the display interface of the image processing device 200.

Optionally, the preset fixing direction may be directly in front of the glasses-wearing user facing the auditorium, i.e. directly in front of an exhibition hall or an academic hall, or the appropriate position can be selected according to empirical data, like a blackboard or a poster, fixed at a certain position in the space of the environmental scene.

Optionally, the preset fixed direction corresponding to the pre-stored environmental scene images can be at least one, namely, one, two or more preset fixed directions can be selected, which is equivalent to realize that a plurality of virtual display areas 300 that can display the target image, so that the user can select to view the target image in a nearby manner. Specifically, when the display mode is the spatial mode, the appropriate preset fixed direction and imaging distance are selected according to the pre-stored environmental scene image, thereby selecting the appropriate virtual display area 300.

In step S610, whether the fixed blocking object image exists in the real-time image or not is determined, if so, step S611 is executed, and if not, the process ends.

In step S611, the imaging distance of the text in the image to be displayed is adjusted, and the adjusted imaging distance is taken as the imaging distance, so that the texts in the image to be displayed are separated from the fixed blocking object image, and the process goes to step S609.

S612, the target image, the display direction, and the imaging distance are sent to the AR glasses 100. The target image, the display direction, and the imaging distance are obtained in step S608 and step S609, respectively.

Figure 7:
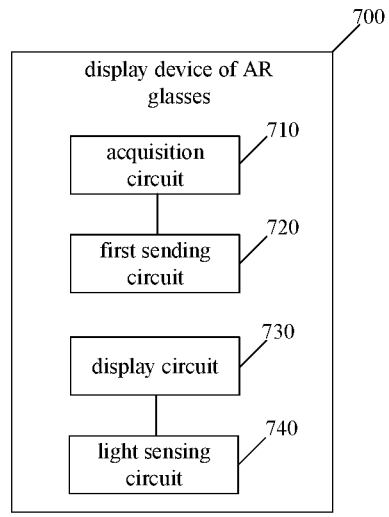
FIG. 7 is a schematic structural diagram of a display device of the AR glasses provided by an embodiment of the present disclosure.

Based on the same invention concept, the embodiment of the present disclosure provides the display device of the AR glasses 100, referring to FIG. 7, the display apparatus 700 of the AR glasses 100 includes: an acquisition circuit 710, a first transmission circuit 720, and a display circuit 730. The acquisition circuit 710 is configured for acquiring the real-time image of the current view field of the user wearing the AR glasses 100 in the real-time environment; the first sending circuit 720 is configured for sending the real-time image to the image processing device 200, so that the image processing device 200 adjusts the image to be displayed based on the real-time image, takes the adjusted image to be displayed as a target image, determines a display direction and an imaging distance according to the real-time image and an environmental scene image pre-stored in the image processing device 200, and sends the target image, the display direction and the imaging distance to the AR glasses 100, wherein the environmental scene image includes the area 300 corresponding to the virtual display area for displaying the target image.

The display circuit 730 is configured for receiving the target image, the display direction, and the imaging distance sent by the image processing device 200, and displaying the target image to the virtual display area 300 according to the display direction and the imaging distance.

Optionally, the acquisition circuit 710 is further configured for scanning the environmental scene within the preset range in the real environment to form the environmental scene image and sending the environmental scene image to the image processing device 200.

Optionally, the display circuit 730 is configured for determining the display mode according to the display mode selection instruction when receiving the display mode selection instruction; display modes include at least one of the projection mode and the space mode, and the display direction of the projection mode correspondingly changes with the current visual field range; and the display direction of the spatial mode is the preset fixed direction.

Optionally, the first sending circuit 720 is configured for sending the display mode to the image processing device 200.

Optionally, referring to FIG. 7, the display device 700 of the AR glasses 100 further includes: a photosensitive circuit 740.

The photosensitive circuit 740 is configured for detecting the light changes in the environmental scene in the real-world environment.

The display circuit 730 is configured for adjusting the transmittance of the lenses of the AR glasses 100 according to the light changes.

Figure 8:
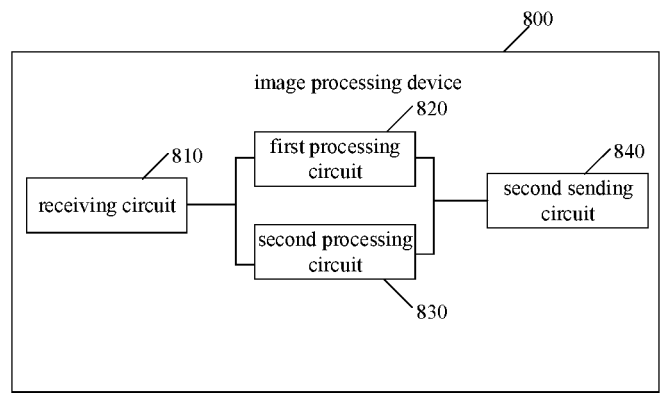
FIG. 8 is a schematic structural diagram of image processing device provided by an embodiment of the present disclosure.

Based on the same invention concept, the embodiment of the present disclosure provides the image processing device 800, referring to FIG. 8, the image processing device 800 includes: a receiving circuit 810, a first processing circuit 820, a second processing circuit 830, and a second sending circuit 840. The receiving circuit 810 is configured for receiving the real-time image of the current visual field range of the user wearing the AR glasses 100 in the real environment sent by the AR glasses 100; the first processing circuit 820 is configured for adjusting the image to be displayed based on the real-time image, and taking the adjusted image to be displayed as a target image; the second processing circuit 830 is configured for determining the display direction and the imaging distance according to the real-time image and the environmental scene image pre-stored in the image processing device 200; and the second sending circuit 840 is configured for sending the object image, the display direction, and the imaging distance to the AR glasses 100.

Optionally, the first processing circuit 820 is configured for performing color analysis on the real-time image to obtain the color of the real-time image, determining whether the display difference between the color of the text in the image to be displayed and the color of the real-time image is less than the preset value; if the display difference between the color of the text in the image to be displayed and the color of the real-time image is less than the preset value, adjusting the color of the text in the image to be displayed so that the display difference between the color of the text in the image to be displayed and the color of the real-time image is not less than the preset value.

Optionally, the first processing circuit 820 is configured for detecting whether there is the image of the person in the real-time image; if there is the image of the person, the display style of the texts in the image to be displayed is adjusted so as to separate the texts in the image to be displayed from the image of the person; and the display style includes at least one of the following: the display area, the display size, and the display quantity.

Optionally, the first processing circuit 820 is configured for detecting whether the real-time image has the fixed blocking object image; the fixed blocking object image corresponds to the fixed blocking object in an environmental scene in the real environment; when there is the fixed blocking object image in the real-time image, the display style of the texts in the image to be displayed is adjusted so that the texts in the image to be displayed are separated from the fixed blocking object image; the display style includes at least one of: the display area, the display size, and the display quantity.

Optionally, the second processing circuit 830 is configured for detecting whether the real-time image has the fixed blocking object image; the fixed blocking object image corresponds to the fixed blocking object in the environmental scene in the real environment; when there is the fixed blocking object image in the real-time image, then the imaging distance of the text in the image to be displayed is adjusted, and the adjusted imaging distance is taken as the imaging distance, so that the texts in the image to be displayed are separated from the fixed blocking object image.

Optionally, the receiving circuit 810 is configured for receiving the display mode sent by the AR glasses 100.

Optionally, the second processing circuit 830 is configured for, if it is determined that the display mode is the projection mode, determining the direction range of the current visual field of the AR glasses 100 according to the real-time image and the environmental scene image pre-stored in the image processing device 200, and taking the preset direction in the direction range of the current visual field as the display direction; wherein if it is determined that the display mode is the spatial mode, the preset fixed direction corresponding to the pre-stored environmental scene image is taken as the display direction.

Based on the same invention concept, the embodiment of the present disclosure provides the image processing device 200, including: a processor, a memory electrically connected to the processor; and at least one program stored in the memory and configured to be executed by the processor, wherein the at least one program is configured for implementing the image processing method according to any one of the embodiments of the present disclosure.

It should be understood by those skilled in the art that the image processing device 200 provided by the embodiments of the present disclosure can be specially designed and manufactured for the required purposes, or can include known device in a general purpose computer. The device has computer programs stored and the computer programs are selectively activated or reconfigured. Such computer programs can be stored in a device (e. g. a computer) readable medium or any type of medium which is suitable for storing electronic instructions and each coupled to a bus.

Figure 9:
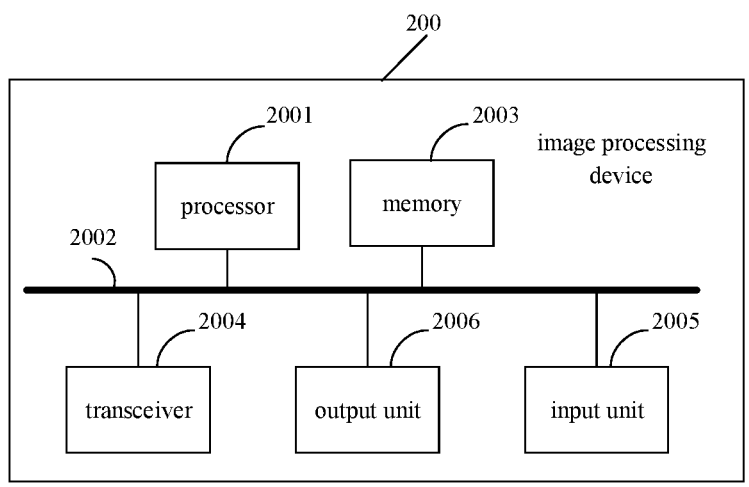
FIG. 9 is a schematic structural diagram of another image processing device provided in an embodiment of the present disclosure.

The present disclosure provides, in an optional embodiment, an electronic device, as shown in FIG. 9, the image processing device 200 includes: a processor 2001 and a memory 2003, wherein the processor 2001 is communicatively connected to the memory 2003, such as via a bus 2002.

The processor 2001 can be a CPU (Central Processing Unit), a general purpose processor, a DSP (Digital Signal Processor), an ASIC (Application Specific Integrated Circuit), an FPGA (Field-Programmable Gate Array) or other programmable logic device, a transistor logic device, a hardware component, or any combination thereof. Various illustrative logical blocks, modules, and circuits described in connection with the present disclosure can be implemented or performed. The processor 2001 can also be a combination that performs computing functions, including, for example, a combination of one or more microprocessors, a combination of a DSP and a microprocessor, etc.

The bus 2002 can include a path to transfer information between the components described above. The bus 2002 can be a PCI (Peripheral Component Interconnect) bus or an EISA (Extended Industry Standard Architecture) bus or the like. The bus 2002 can be divided into an address bus, a data bus, a control bus, etc. For ease of illustration, only one bold line is shown in FIG. 9, but does not indicate that there is only one bus or one type of bus.

The memory 2003 can be, but is not limited to, a ROM (Read-Only Memory) or other type of static storage device that can store static information and instructions, a RAM (Random Access Memory), or other types of dynamic storage devices that can store information and instructions, or can also be EEPROM (Electrically Erasable Programmable Read Only Memory), CD-ROM (Compact Disc Read Only Memory), or other optical disc storage, the optical disc storage (including a compact disc, a laser disc, an optical disc, a digital universal disc, a blue-ray disc and the like), a disk storage medium or other magnetic storage device, or any other medium configurable to contain or store an expected program code in an instruction or data structure form and accessible for a computer.

Optionally, the image processing device 200 can further include a transceiver 2004, wherein the transceiver 2004 can be configured for receiving and sending signals; the transceiver 2004 can allow the image processing device 200 to communicate in a wireless or wired manner with other devices to exchange data. It should be noted that the transceiver 2004 is not limited to one in practice.

Optionally, the image processing device 200 can further include an input unit 2005, wherein the input unit 2005 can be configured for receiving input numbers, characters, images and/or sound information, or generating key signal inputs related to user settings and function controls of the image processing device 200; the input unit 2005 can include, but is not limited to, one or more of a touch screen, a physical keyboard, function keys (such as volume control keys, switch keys, etc.), a trackball, a mouse, a joystick, a camera, a microphone, etc.

Optionally, the image processing device 200 can further include an output unit 2006, wherein the output unit 2006 can be configured for outputting or presenting information processed by the processor 2001; the output unit 2006 can include, but is not limited to, one or more of a display device, a speaker, a vibration device, etc.

Although FIG. 9 illustrates the image processing device 200 having various devices, it should be understood that not all of the illustrated devices are required to be implemented or provided. More or fewer devices can alternatively be implemented or provided.

Optionally, the memory 2003 is configured for storing application code for executing the disclosed solutions and the execution is controlled by the processor 2001. The processor 2001 is configured for executing the application code stored in the memory 2003 to implement any of the image processing methods provided by embodiments of the present disclosure.

Based on the same invention concept, the embodiments of the present disclosure provide the computer-readable storage medium for storing computer instructions that, when executed on the computer, implement the display method of the AR glasses 100 of any embodiment of the present disclosure or the image processing method of any embodiment of the present disclosure.

The computer readable storage medium includes, but is not limited to, any type of disk (including floppy disks, hard disks, optical disks, CD-ROMs, and magneto-optical disks), ROMs, RAMs, EPROMs (Erasable Programmable Read-Only Memories), EEPROM, flash memory, magnetic or optical cards. That is, the readable medium includes any medium that can be read by device (e.g. a computer) to store or transmit information.

With the embodiments of the present disclosure, at least the following advantageous effects can be achieved.

(1) By using the embodiments of the present disclosure, the target image can be modified in real time according to the change of the environmental scene, so as to adapt to the environmental scene in the real environment where the AR glasses are located in real time, and be organically fused with the real-time image of the environmental scene in the real environment, so as to ensure that the user can always obtain an immersive use experience, thereby improving the user experience.

(2) The AR glasses 100 of the embodiments of the present disclosure can select different display modes including the projection mode and the spatial mode according to different use scenarios, and the two modes can be easily switched, thereby giving the user a better experience in different application scenarios.

(3) The AR glasses 100 of the embodiment of the present disclosure can be used as the teleprompter to present the target image display including the word extraction directly in front of the user, the user can move freely, and the target image can always be in front of the user to remind the user of words; or the target image is fixed at the specific orientation, and when the user needs to watch the reminding words, the reminding words can be seen by the user by turning the head to the specific orientation, which is convenient to use.

(4) The embodiment of the present disclosure adopts the split-type design of the display system of the AR glasses 100, and separates the AR glasses 100 from the image processing device 200, two parts hardware of processing and displaying are separated, that is, and the image processing and the formation of the target image are both completed by the image processing device 200 and sent back to the AR glasses 100 for display, so as to reduce the weight of the glasses to be easily worn by the user.

(5) The embodiments of the present disclosure can adjust the display area, display size or display quantity of the texts of the image to be displayed according to the real-time image, and at the same time can also adjust the imaging distance of the image to be displayed, so that the texts in the image to be displayed are separated from the image of the person and/or the fixed blocking object, thereby separating the text in the target image of the virtual display area 300 from the person and/or the fixed blocking object in the environmental scene in real time, ensuring clear display of the target image.

Those skilled in the art will understand that the AR glasses 100 described above can also be replaced with other types of AR wearable devices, such as the AR helmets.

Those skilled in the art should understand that the various operations, methods, steps, acts, schemes, etc. discussed in the present disclosure may be alternated, altered, combined, or deleted. Further, operations, methods, other steps, acts, and schemes in the various operations, methods, and schemes discussed in the present disclosure may be alternated, altered, rearranged, decomposed, combined, or deleted. Further, various operations, methods, steps, acts, and schemes disclosed in the prior art may also be alternated, altered, rearranged, decomposed, combined, or deleted.

In the description of the present disclosure, it should be understood that the orientation or positional relationship indicated by the terms "center", "upper", "lower", "front", "rear", "left", "right", "vertical", "horizontal", "top", "bottom", "inner", "outer", and the like is based on the orientation or positional relationship shown in the drawings, and is merely for convenience of describing the disclosure and simplifying the description, but not intended or implied that the referenced device or element must have a particular orientation, be constructed and operated in a particular orientation, and thus should not be construed as limiting the present disclosure.

The terms "first" and "second" are configured for descriptive purposes only and are not to be construed as indicating or implying relative importance or implicitly indicating the number of technical features indicated. Therefore, a feature defined by "first" and "second" may explicitly or implicitly indicate inclusion of one or more such features. In the description of the present disclosure, the meaning of "a plurality of" is two or more unless otherwise specified.

In the description of the present disclosure, it should be noted that the terms "mount", "connect" and "connected" are to be construed broadly, e.g. may be fixedly connected, removably connected, or integrally connected, may be a direct connection or an indirect connection through an intermediate medium, or a communication between two elements, unless explicitly stated or defined. The specific meanings of the above terms in the present disclosure will be understood on a case-by-case basis by those of ordinary skill in the art.

In the description of the present disclosure, particular features, structures, materials, or characteristics can be combined in any suitable manner in any one or more embodiments or examples.

It should be understood that, although the various steps in the flowcharts of the drawings are shown in order as indicated by the arrows, the steps are not necessarily performed in the order indicated by the arrows. The steps are performed in no strict order unless explicitly stated herein, and may be performed in other orders. Furthermore, at least some of the steps in the flowcharts of the drawings may include a plurality of sub-steps or a plurality of stages, which are not necessarily performed at the same time, but may be performed at different times, in a different order, and may be performed in turn or in alternation with at least some of the other steps or sub-steps or stages of other steps.

While the foregoing is only part of embodiments of the present disclosure, it should be understood by those skilled in the art that various improvements and modifications may be made without departing from the principle of the present disclosure, and theses improvement and modifications shall fall within the scope of protection of the present disclosure.

What is claimed is:

1. An image processing and displaying method operable by a display system, wherein the display system comprises an Augmented Reality (AR) device and an image processing device, and the image processing and displaying method comprises:

acquiring, by the AR device, a real-time image of a current view field of a user wearing the AR device in a real environment;

sending, by the AR device, the real-time image to the image processing device;

receiving, by the AR device, a display direction, an imaging distance, and a target image sent by the image processing device, and displaying, by the AR device, the target image in a virtual display area according to the display direction and the imaging distance, wherein the image processing and displaying method further comprises: after sending, by the AR device, the real-time image to the image processing device, receiving, by the image processing device, the real-time image sent by the AR device;

adjusting, by the image processing device, an image to be displayed based on the real-time image, and taking, by the image processing device, the adjusted image to be displayed as the target image;

determining, by the image processing device, the display direction and the imaging distance according to the real-time image and a pre-stored environmental scene image; and sending the target image, the display direction, and the imaging distance to the AR device, wherein the environmental scene image comprises an area corresponding to a virtual display area configured for displaying the target image, wherein the adjusting, by the image processing device, the image to be displayed based on the real-time image, comprises:

performing color analysis on the real-time image to obtain a color of the real-time image;

determining whether a display difference between a color of a text in the image to be displayed and the color of the real-time image is less than a preset value;

when the display difference between the color of the text in the image to be displayed and the color of the real-time image is less than the preset value, adjusting the color of the text in the image to be displayed, to enable the display difference between the color of the text in the image to be displayed and the color of the real-time image to be not less than the preset value.

2. The image processing and displaying method according to claim 1, further comprising: before acquiring, by the AR device, the real-time image of the current view field of the user wearing the AR device in the real environment, receiving a display mode selection instruction;

determining a display mode according to the display mode selection instruction, wherein the display mode comprises a projection mode and a spatial mode; in the display mode, the display direction correspondingly changes as the current view field changes; in the spatial mode, the display direction is a preset fixed direction; and sending the display mode to the image processing device.

3. The image processing and displaying method according to claim 1, further comprising: before acquiring, by the AR device, the real-time image of the current view field of the user wearing the AR device in the real environment, scanning an environmental scene within a preset range in the real environment to form an environmental scene image;

sending the environmental scene image to the image processing device.

4. The image processing and displaying method according to claim 1, further comprising:

detecting a light change of the environmental scene in the real environment;

adjusting a transmittance of a lens of the AR device according to the light change.

5. The image processing and displaying method according to claim 1, further comprising: before receiving, by the image processing device, the real-time image sent by the AR device, receiving the display mode sent by the AR device;

the determining the display direction and the imaging distance according to the real-time image and the pre-stored environmental scene image comprises:

when determining that the display mode is the projection mode, determining a direction range of the current visual field of the user wearing the AR device according to the real-time image and the pre-stored environmental scene image, and taking a preset direction in the direction range of the current visual field as the display direction; and when determining that the display mode is the spatial mode, taking the preset fixed direction corresponding to the pre-stored environmental scene image as the display direction.

6. The image processing and displaying method according to claim 1, wherein the AR device is AR glasses or an AR helmet.

7. A display system, comprising:

a processor, a memory electrically connected to the processor;

at least one program stored in the memory and configured for being executed by the processor, wherein the at least one program is configured for implementing the image processing and displaying method according to claim 1.

8. The display system according to claim 7, wherein the at least one program is further configured for: before acquiring the real-time image of the current view field of the user wearing the AR device in the real environment, receiving a display mode selection instruction;

determining a display mode according to the display mode selection instruction, wherein the display mode comprises a projection mode and a spatial mode; in the display mode, the display direction correspondingly changes as the current view field changes; in the spatial mode, the display direction is a preset fixed direction; and sending the display mode to the image processing device.

9. The display system according to claim 7, wherein the at least one program is further configured for: before acquiring the real-time image of the current view field of the user wearing the AR device in the real environment, scanning an environmental scene within a preset range in the real environment to form an environmental scene image;

sending the environmental scene image to the image processing device.

10. The display system according to claim 7, wherein the at least one program is further configured for:

detecting a light change of the environmental scene in the real environment;

adjusting a transmittance of a lens of the AR device according to the light change.

11. A non-transitory computer-readable storage medium, wherein the computer-readable storage medium is configured for storing a computer instruction which, when executed on a computer, implement the image processing and displaying method according to claim 1.

12. An image processing and displaying method operable by a display system, wherein the display system comprises an AR device and an image processing device, and the image processing and displaying method comprises:

acquiring, by the AR device, a real-time image of a current view field of a user wearing the AR device in a real environment;

sending, by the AR device, the real-time image to the image processing device;

receiving, by the AR device, a display direction, an imaging distance, and a target image sent by the image processing device, and displaying, by the AR device, the target image in a virtual display area according to the display direction and the imaging distance, wherein the image processing and displaying method further comprises: after sending, by the AR device, the real-time image to the image processing device, receiving, by the image processing device, the real-time image sent by the AR device;

adjusting, by the image processing device, an image to be displayed based on the real-time image, and taking, by the image processing device, the adjusted image to be displayed as the target image;

determining, by the image processing device, the display direction and the imaging distance according to the real-time image and a pre-stored environmental scene image; and sending the target image, the display direction, and the imaging distance to the AR device, wherein the environmental scene image comprises an area corresponding to a virtual display area configured for displaying the target image, wherein the adjusting, by the image processing device, the image to be displayed based on the real-time image, comprises:

detecting whether there is an image of a person in the real-time image;

when there is the image of the person in the real-time image, adjusting a display style of the text in the image to be displayed, to enable the text in the image to be displayed to be separated from the image of the person, wherein the display style comprises at least one of: a display area, a display size, and a display quantity.

13. The image processing and displaying method according to claim 12, further comprising: before acquiring, by the AR device, the real-time image of the current view field of the user wearing the AR device in the real environment, receiving a display mode selection instruction;

determining a display mode according to the display mode selection instruction, wherein the display mode comprises a projection mode and a spatial mode; in the display mode, the display direction correspondingly changes as the current view field changes; in the spatial mode, the display direction is a preset fixed direction; and sending the display mode to the image processing device.

14. The image processing and displaying method according to claim 12, further comprising: before acquiring, by the AR device, the real-time image of the current view field of the user wearing the AR device in the real environment, scanning an environmental scene within a preset range in the real environment to form an environmental scene image;

sending the environmental scene image to the image processing device.

15. The image processing and displaying method according to claim 12, further comprising:

detecting a light change of the environmental scene in the real environment;

adjusting a transmittance of a lens of the AR device according to the light change.

16. The image processing and displaying method according to claim 12, further comprising: before receiving, by the image processing device, the real-time image sent by the AR device, receiving the display mode sent by the AR device;

the determining the display direction and the imaging distance according to the real-time image and the pre-stored environmental scene image comprises:

when determining that the display mode is the projection mode, determining a direction range of the current visual field of the user wearing the AR device according to the real-time image and the pre-stored environmental scene image, and taking a preset direction in the direction range of the current visual field as the display direction; and when determining that the display mode is the spatial mode, taking the preset fixed direction corresponding to the pre-stored environmental scene image as the display direction.

17. The image processing and displaying method according to claim 12, wherein the AR device is AR glasses or an AR helmet.

18. A display system, comprising:

a processor, a memory electrically connected to the processor;

at least one program stored in the memory and configured for being executed by the processor, wherein the at least one program is configured for implementing the image processing and displaying method according to claim 12.

19. The display system according to claim 18, wherein the at least one program is further configured for: before acquiring the real-time image of the current view field of the user wearing the AR device in the real environment, receiving a display mode selection instruction;

determining a display mode according to the display mode selection instruction, wherein the display mode comprises a projection mode and a spatial mode; in the display mode, the display direction correspondingly changes as the current view field changes; in the spatial mode, the display direction is a preset fixed direction; and sending the display mode to the image processing device.

20. An image processing device, comprising:

a receiving circuit, configured for receiving a real-time image of a current view field of a user wearing an AR device in a real environment sent by the AR device;

a first processing circuit, configured for adjusting an image to be displayed based on the real-time image, and taking the adjusted image to be displayed as a target image;

a second processing circuit, configured for determining a display direction and an imaging distance according to the real-time image and an environmental scene image pre-stored in the image processing device; and a second sending circuit, configured for sending the target image, the display direction, and the imaging distance to the AR device, wherein the environmental scene image comprises an area corresponding to a virtual display area configured for displaying the target image, wherein the adjusting the image to be displayed based on the real-time image comprises:

performing color analysis on the real-time image to obtain a color of the real-time image;

determining whether a display difference between a color of a text in the image to be displayed and the color of the real-time image is less than a preset value;

when the display difference between the color of the text in the image to be displayed and the color of the real-time image is less than the preset value, adjusting the color of the text in the image to be displayed, to enable the display difference between the color of the text in the image to be displayed and the color of the real-time image to be not less than the preset value.

* * * * *